United States Patent
Little

[15] 3,693,592
[45] Sept. 26, 1972

[54] HORSE BARN

[72] Inventor: Glen Melvon Little, P.O. Box 244, Burns, Oreg. 97220

[22] Filed: Nov. 16, 1970

[21] Appl. No.: 89,619

Related U.S. Application Data

[63] Continuation-in-part of Ser. No. 20,008, May 15, 1970, abandoned.

[52] U.S. Cl. .................................. 119/16, 119/27
[51] Int. Cl. .................................. A01k 01/00
[58] Field of Search ...... 119/27, 16, 20; 50/227, 455, 50/457, 458

[56] References Cited

UNITED STATES PATENTS

| | | | |
|---|---|---|---|
| 2,652,025 | 9/1953 | Beatty | 119/27 |
| 374,249 | 12/1887 | Hartle | 119/27 |
| 447,561 | 3/1891 | Davis | 119/27 |
| 1,485,356 | 3/1924 | Ackerman | 119/27 |
| 2,843,085 | 7/1958 | McKee | 119/16 |
| 629,726 | 7/1899 | Stitzer | 119/11 |

FOREIGN PATENTS OR APPLICATIONS

| | | |
|---|---|---|
| 695,991 | 8/1953 | Great Britain |

Primary Examiner—Hugh R. Chamblee
Attorney—Daniel P. Chernoff

[57] ABSTRACT

A horse barn containing a plurality of stalls octagonally shaped for anti-casting purposes and serially arranged in one or more rows. The individual stalls are formed of prefabricated wall and door sections comprised of tongue-and-groove wood slates reinforced with a series of tie rods and framed by channel iron members. These modular sections are secured together and to floor anchors by welding. A subroof formed over the top of the stall array provides storage for hay or other feed with a separate upper roof supported over the entire barn structure for providing protection from the elements.

7 Claims, 10 Drawing Figures

PATENTED SEP 26 1972

HORSE BARN

CROSS-REFERENCE TO RELATED APPLICATION

The present application is a continuation-in-part of a pending application of the same inventor, Ser. No. 20,008 filed May 15, 1970, now abandoned.

BACKGROUND OF THE INVENTION

The present invention is directed to a prefabricated multiple-stall horsebarn which can be readily assembled at the site from modular sections and thereafter, if desired, broken down for transportation and re-erection at a different site. In addition to the foregoing features, the design herein proposed possesses several additional distinctive features and advantages over the prior art.

At racetracks, state and local fairs, rodeos, ranches, horsebreeding farms and other places where there is a need for multiple-horse stall facilities, the present exorbitant and ever-increasing cost of conventional building techniques mandates, for an economical, profitable plant, the use in new horse barn construction of prefabricated (i.e., off-site) modular sections which can be readily assembled into a finished barn structure at the site by relatively unskilled personnel. Because of the rigors to which the barn structure is subjected in use, it is necessary that, notwithstanding its prefabricated nature, the structure be sturdy, easily repairable and of long life.

SUMMARY OF THE INVENTION

The horse barn of the present invention comprises a plurality of individual stalls which are formed of prefabricated wall and door sections each comprised of tongue-and-groove wood slates reinforced with a series of tie rods and framed by channel iron members. These modular wall and door sections are secured together and to floor anchors by welding.

The stalls can feasibly be arrayed in serial abutting alignment in one or more rows extending the length of the roof structure. The rows themselves may be arranged either in abutting pairs or with individual rows separated by a walkway.

The individual horse stalls are preferably of octagonal configuration in order to avoid casting of the horse in the stall. Casting occurs when a horse lays down to roll over on its back and in the process rolls up against an obstacle, such as a wall. In such a situation the horse may not attempt to right himself by rolling back over, but may instead remain on its back braced up against the wall. If the horse lies on its back in this position for any prolonged period of time, the stomach fluids drain into the lungs and, if the horse is not soon righted, this will cause drowning. Injuries other than self-suffocation can also be sustained by the horse in casting, and in addition there are substantial dangers to trainers and handlers attempting to assist the horse in returning to the upright position. By utilizing an eight-sided wall configuration for the stall, rather than the conventional rectangular or square arrangement, there is no sheer vertical surface of sufficient extent against which the horse can roll over on its back into a braced position and be unable to right himself. The octagonal-shaped stall has a further advantage in that a diamond-shaped enclosure is created in each two-by-two array of four abutting stalls which can be used as a tack room for storing bridles, harnesses, blankets, clothing and the like.

The site is typically prepared for receiving the barn structure by pouring either a concrete floor or imbedding concrete footings therein to receive the anchoring plates for holding and securing together the various modular wall and door sections of the stall subunit.

A flat subroof is provided over the top of the stall array for storage of hay and other feed which can be pitched, as needed, through openings above the individual stalls and down onto the floor. If desired, a separate upper roof structure, extending beyond the exteriors of the stall array and supported on either cantilevered trusses or on more conventional vertical leg type trusses can also be provided as a protective covering over the barn structure. A turnbuckle-and-rod arrangement is utilized in the roof design to give rigidity to the modular stall structure.

It is therefore a principal objective of the present invention to provide a new, improved and economical horse barn of modular, prefabricated construction which can be readily assembled at the site with relatively unskilled labor and thereafter can be disassembled for transportation and re-erection at a new site.

It is a principal feature of the present invention to provide a new and improved form of prefabricated modular horse barn comprises of reinforced wall and door sections which have sufficient strength and rigidity to survive the rigors of long and hard use.

It is a further feature of the present invention to provide a horse barn comprised of a plurality of stalls of octagonal configuration so as to minimize casting and thereby reduce the likelihood of serious injury or death to the horses stabled therein.

It is an advantage of the octagonal stall design of the horse barn of the present invention that a diamond-shaped enclosure is created within each group of four abutting stalls which is usable for storage of tack and for other purposes.

The foregoing and other objectives, features and advantages of the present invention will be more readily understood upon consideration of the following detailed description of the invention taken in conjunction with the accompanying drawings.

Figure 1:
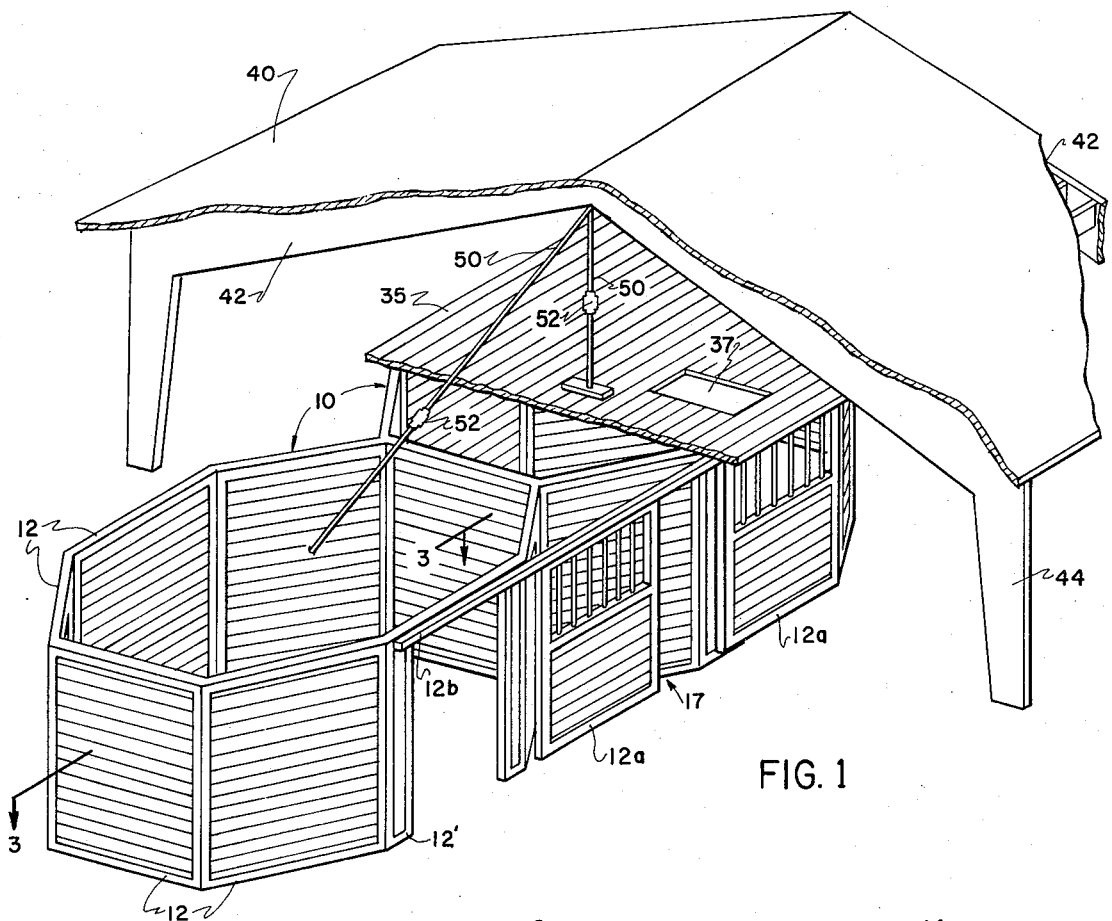
FIG. 1 is a perspective view, with the roof portion partially broken away, showing a principal embodiment of the horse barn construction of the present invention.
Figure 2:
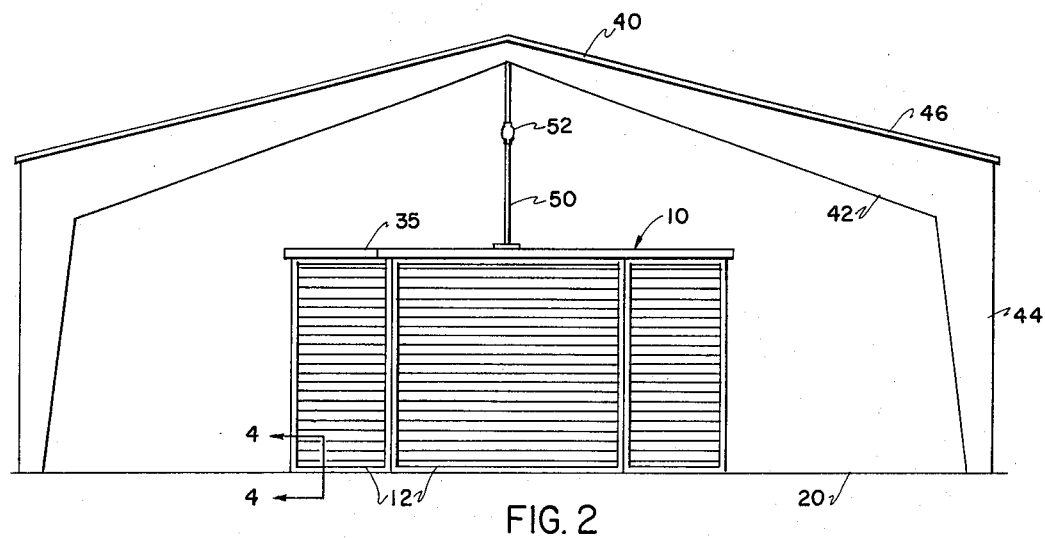
FIG. 2 is an end view of the horse barn embodiment shown in FIG. 1.
Figure 3:
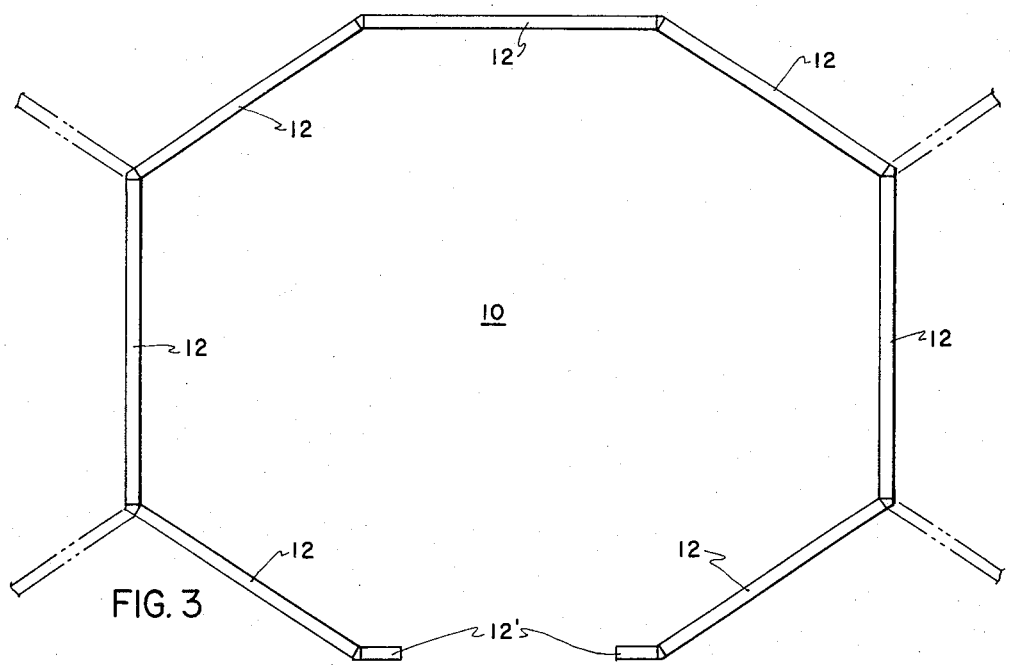
FIG. 3 is a top sectional view, slightly enlarged, of the walls of a single stall taken along the line 3—3 in FIG. 1.

Referring initially to FIGS. 1 and 2, a horse barn embodiment utilizing the teachings of the present invention is shown comprising a single row of stalls 10 formed of prefabricated modular wall and door panel sections 12 and 12'. Preferably each of the modular panel sections is of equal dimension so as to form a regular octagonal enclosure, as shown in FIG. 3, and thereby minimize the number of different components required for the assembly of the barn structure. The panel employed for the door section 12' is of equivalent exterior dimension to the wall sections so as to be interchangeable therewith, thus facilitating the location of the door on whatever side of the stall it is desired. The door panel can be one of a number of known types, for example it could, as illustrated in FIG. 1, be a sliding door 12a suspended from an overhead rail 12b, or alternatively a so-called "dutch type" door carried on hinges, (see FIG. 10), or merely a series of horizontal rope attached by hooks to the door frame.

Figure 7:
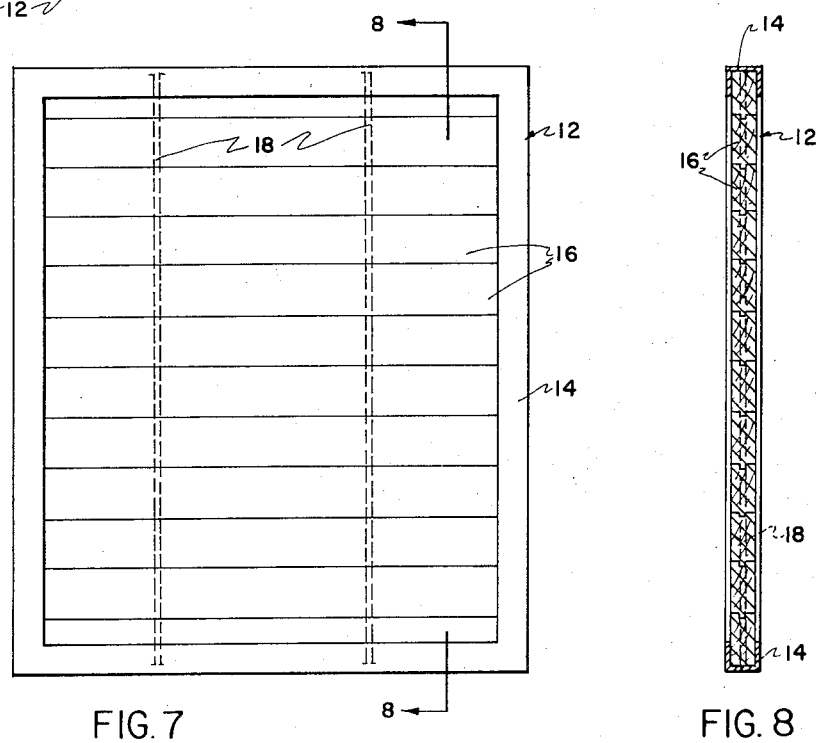
FIG. 7 is a front plane view depicting an illustrative form of reinforced prefabricated wall section module used in constructing the stall enclosure of the present invention.
Figure 8:
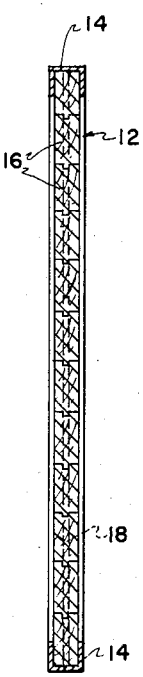
FIG. 8 is a vertical sectional view of the wall section taken along the line 8—8 in FIG. 7.

FIGS. 7 and 8 depict the constructional details of a typical modular wall panel section 12 which, while prefabricated, is designed for long use in service by virtue of its sturdy, ruggedized design. The panel section comprises a metal frame 14 formed of welded channel iron members holding therein a wall formed of tongue-in-groove horizontal plank inserts. For reinforcement purposes a grid of vertical tie rods 18 connecting the top and bottom edges of the frame member 14 is provided with suitable fastening means for adjusting the tension in the rod members. Alternatively the planks could be arranged vertically, in which case the rods 18 would be translated so as to run horizontally between adjacent sides of the frame member.

Figure 5:
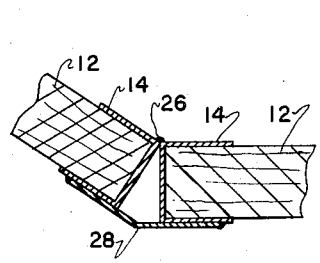
FIG. 5 is a detail view of the angle strip members for joining together two adjacent wall sections.
Figure 4:
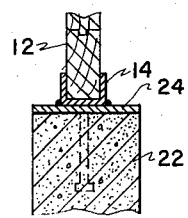
FIG. 4 is a detail view, taken along the line 4—4 in FIG. 2, of an exemplary form of wall support and floor anchor construction for use with the horse barn construction of the present invention.
Figure 6:
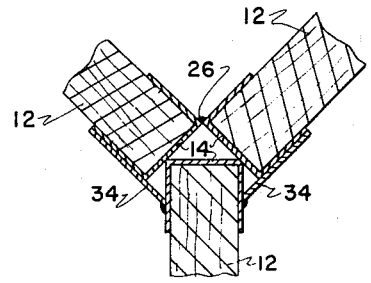
FIG. 6 is a detail view of the angle arm construction used to join together three adjacent wall sections into a Y-shaped juncture.

The prefabricated panels 12 and 12' are erected at the site into stall modules 10 by connecting them to each other and to floor anchors in the manner shown in the detail views of FIGS. 4–6.

The floor surface 20, on which the structure is to be erected, is prepared for receiving the stall modules by either pouring a concrete floor slab or alternatively embedding concrete footings 22 therein to receive the metal anchoring plates 24 to which the bottom edge of the panel frame 14 is welded, as shown in FIG. 4.

Adjacent canted panel sections 12 and 12' forming the octahedral stall enclosure are joined together, as depicted in FIG. 5, by welding along their respective abutting edge frame surfaces 26 and securing a corner angle arm strip 28 also by welding to the separated edge surfaces of the respective frame members 14 of the adjoining panels. The corner cap strip 28 serves both to align and lock the wall sections 12 into the desired polygon configuration. At the Y juncture of adjacent stall modules 10, as shown in FIG. 6, where a panel section 12 serves as a common wall between adjacent stalls, the panel sections are aligned into the desired configuration and secured together by a weld 26 along the common abutting edge surfaces of the two wall sections forming the arms of the Y, in conjunction with a respective pair of corner capping angle arm strips 34 joining the arms of the Y to its base section.

To complete the erection of the barn structure, after the wall and door panel sections 12 and 12' have been assembled as described immediately above to form a row of abutting octagonal stall enclosures 10, a subroof 35 is planked over the top of the stall frame. This subroof can be used for the storage of feed which can then be dispensed through openings 37 in the roof onto the floor of the individual stalls. The barn structure is then topped out by an upper roof 40 formed of rafters supported on spaced roof truss members 42 resting on integral vertical leg portions 44 and covered by corrugated metal decking 46 or other suitable roof covering. In order to add rigidity to the structure and bearing support for the load carried on the subroof, it is preferable that tie rods 50 tensioned by associated turnbuckles 52 and connecting from the center span of the respective roof trusses to the subroof portions of adjacent stalls be provided.

Figure 9:
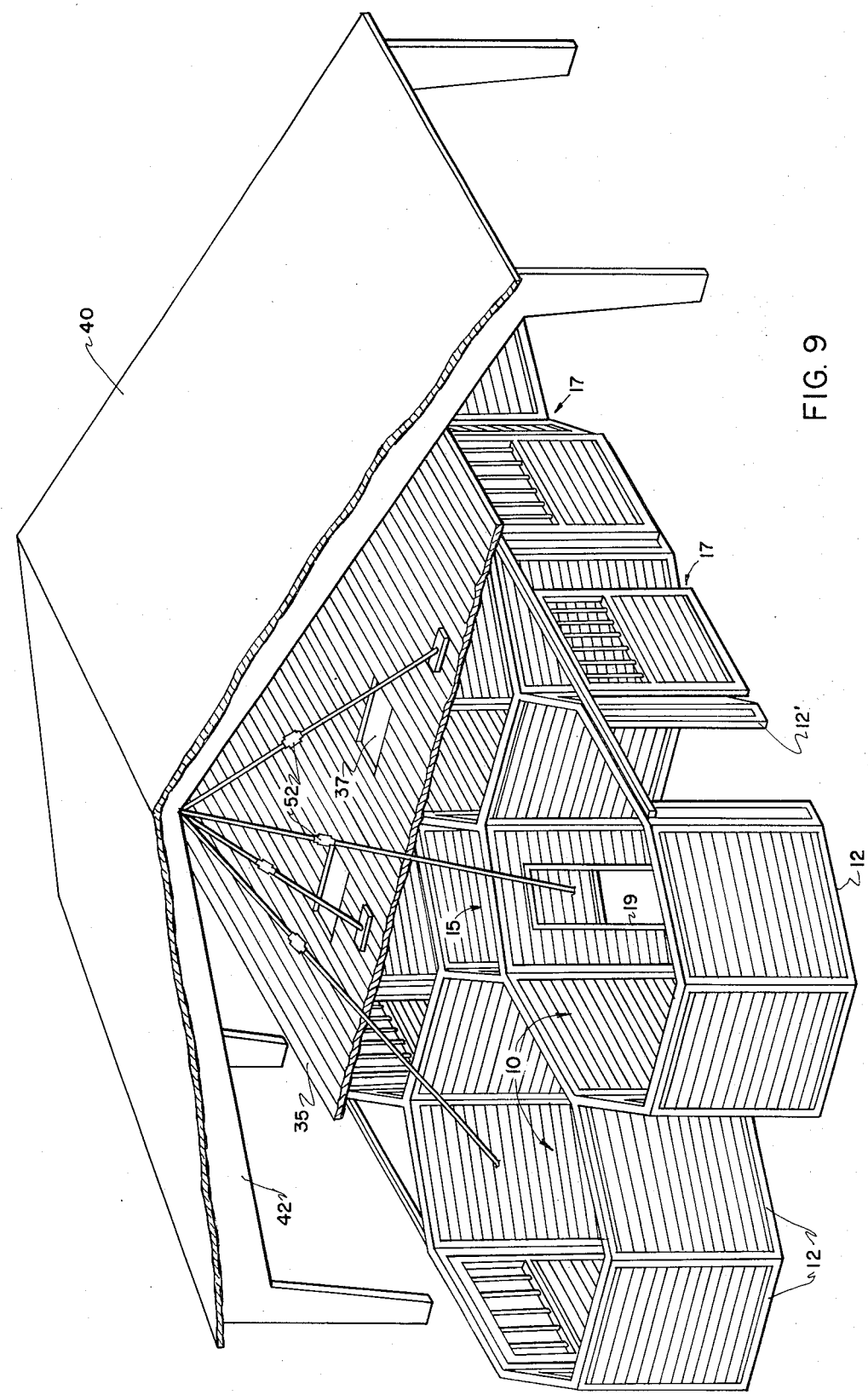
FIG. 9 is a perspective view, with the roof portion partially broken away, showing an embodiment of the horse barn construction of the present invention with the stalls arranged in a pair of abutting rows.

FIG. 9 shows an embodiment of the horse barn similar to that of FIGS. 1 and 2 except that in lieu of a single row of stall units a pair of abutting rows are provided, the construction in all other material respects being substantially identical. In such an array each group of two-by-two stall modules 10 creates a diamond-shaped enclosure 15 in the center thereof which can be used as a tack storage room with access provided through one or more door openings 19 provided in the adjacent wall panel sections of adjoining stalls.

Figure 10:
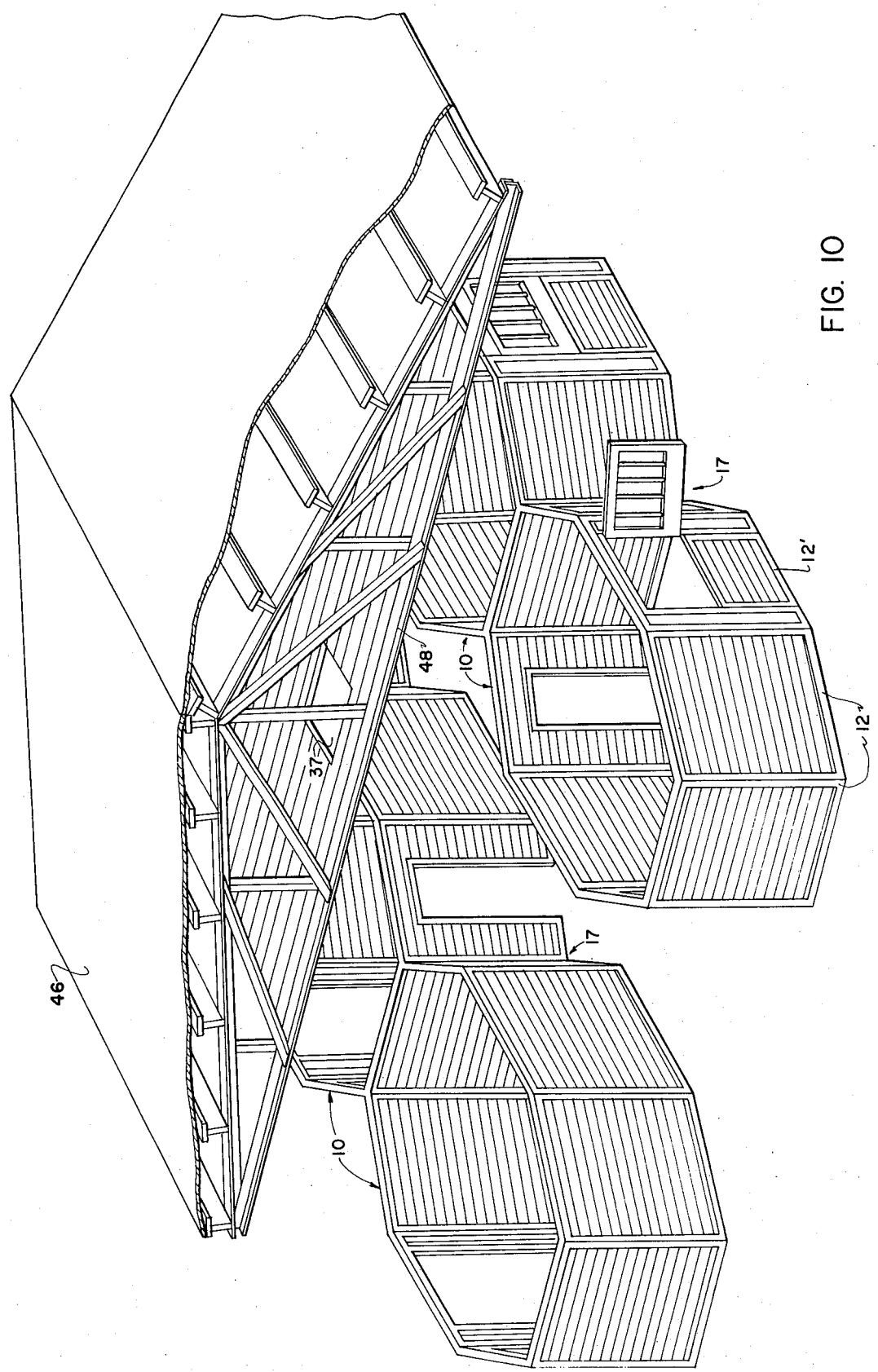
FIG. 10 is a perspective view, with the roof portion partially broken away, showing an alternative embodiment of the roof structure for the horse barn construction and with the individual stalls arranged in two separated rows so as to provide a central passageway therebetween.

FIG. 10 is an alternative embodiment of the horse barn structure in which two spaced apart rows of stalls 10 are provided so as to create a central walkway therebetween and a roof structure of the cantilevered type is employed. The cantilevered roof trusses 48, of conventional design, rest on the top of and are welded to the stall frame walls. The subroof 35, if desired, can be planked in as before, or omitted, since covered storage space is provided at ground level in the triangular niches 17 formed along the exterior of adjacent walls of adjoining stalls.

The stall units 10 of the barn assembly can be quickly disassembled by dismantling the wall panel sections 12 and 12' by cutting them with a flame torch along the abutting weld lines and thereafter they can be transported flat for re-erection at a different site.

The terms and expressions which have been employed in the foregoing abstract and specification are used therein as terms of description and not limitation, and there is no intention, in use of such terms and expressions, of excluding equivalents of the features shown and described, or portions thereof, it being recognized that the scope of the invention is defined and limited only by the claims which follow.

What is claimed is:

1. A horse barn comprising a multiplicity of modular stall units, each of said stall modules being constructed of a plurality of rectangular wall panel sections formed of a four-sided metal channel member framing a row of planks connected together by interlocking joints along their lateral edges and reinforced by tensioned tie bar means connecting a pair of opposes edges of said channel member.

2. The horse barn construction of claim 1 wherein the walls of said stall modules form a substantially regular octagon with the width of said wall panel sections being sufficiently short to prevent casting of a horse stabled therein.

3. The horse barn construction of claim 2 wherein said stall units are arranged in a pair of abutting rows with each two-by-two array of units forming a diamond-shaped enclosure in the interior of said array with access to said enclosure being provided by a door opening in at least one of said wall panel sections forming said enclosure.

4. The horse barn constructed of claim 1 wherein said panel wall sections in a stall module are arranged to form an enclosed self-standing polygon with the vertical edges of channel members of respective adjacent sections being fastened directly to each other and the bottom edges of said channel members being connected to respective anchor plates secured to fittings formed in the floor of said barn.

5. The horse barn construction of claim 4 wherein said modular stall units are arranged in a row and a flat horizontal subroof is provided covering said stall enclosures and supported upon the upper edges of said wall panel sections.

6. A horse barn construction according to claim 5 wherein an upper roof is provided above said subroof forming an enclosed storage area therebetween, said upper roof being supported on a plurality of trusses spaced along the length of said row of stall units.

7. A horse barn comprising a multiplicity of octagonal-shaped modular stall units arranged in a pair of abutting rows with each two-by-two array of units forming a diamond-shaped enclosure in the interior of said array, with access to said enclosure being provided by a door opening in at least one of the walls forming said enclosure.

* * * * *